Patented Mar. 10, 1936

2,033,292

UNITED STATES PATENT OFFICE 2,033,292

CATALYTIC PROCESS FOR HYDROGENATION OF FURFURANES

Wilbur A. Lazier, Marshallton, Del., assignor to E. I. du Pont de Nemours & Company, Wilmington, Del., a corporation of Delaware No Drawing. Application June 30, 1932,
Serial No. 620,296

12 Claims. (Cl. 260—54)

This invention relates to a novel hydrogenation process, and it particularly pertains to a process for hydrogenating unsaturated compounds of the furfurane type. The invention relates in its preferred aspect to the production of the class of compounds known as the hydrofurfuranes.

One object of the invention relates to a highly satisfactory and economical process for hydrogenating furfurane and alkyl and aryl furfuranes to produce hydrofurfuranes. Another object of the invention relates to the hydrogenation of furfuranes in the liquid phase. A still further object of the invention pertains to the liquid phase hydrogenation of furfuranes in the presence of a base metal catalyst taken from the iron group of metals, under selected temperatures and pressures. Other objects of the invention will become apparent from the following description of the invention.

These objects are accomplished by the following process which comprises, in brief, subjecting a furfurane or an alkyl or aryl substituted furfurane to hydrogenation in the liquid phase and in the presence of a base metal catalyst under elevated temperature and pressure. Under the controlled conditions of the process, the reaction proceeds rapidly and smoothly with the formation of high yields of the corresponding tetrahydrofurfurane. I have found that with proper control of the reaction conditions, as described hereinafter, there is relatively little loss thru ring splitting side reactions, and the yield is almost quantitative.

The following examples which are illustrative only, and which are not intended to limit the scope of the invention, describe preferred forms of the invention:

Example 1

A nickel-chromium oxide hydrogenation catalyst is prepared as follows: 290 g. of recrystallized nickel nitrate is dissolved in 1.5 liters of water and added to a solution of 150 g. of ammonium chromate in 500 cc. of water. The mixed solutions are heated to boiling and ammonia is added to neutrality. The brick red precipitate of nickel ammonium chromate is filtered, washed and dried at 110° C. It is then ignited for two hours at 400° C. and reduced in a stream of hydrogen gas for 16 hours at 500° C. and cooled in an inert atmosphere to yield a catalyst comprising mainly metallic nickel supported on chromium oxide.

The hydrogenation of methyl furfurane to tetrahydromethyl furfurane was carried out with this nickel-chromium oxide composition as the catalyst. Ten g. of the catalyst, prepared as just described, 100 g. of methanol and 125 g. of methyl furfurane were charged into a pressure resisting autoclave capable of being agitated. A hydrogen pressure of 800 lbs. per sq. in. was applied and the temperature raised to 165° C. With good agitation the pressure ceased to fall after 1 to 2 hours which fact was taken as evidence of completion of the reaction. Upon removing the liquid products from the reaction vessel and distilling them, tetrahydromethyl furfurane equivalent to a 75% conversion was obtained. In addition to the tetrahydromethyl furfurane, a small quantity of normal butanol was formed in the reaction.

The process as outlined above is applicable to the hydrogenation of $\alpha$, $\alpha'$-dimethyl furfurane to the corresponding tetrahydro dimethyl furfurane.

Example 2

A nickel-on-kieselguhr catalyst is prepared as follows: One mole of nickel nitrate (290 g.) is dissolved in the minimum quantity of water and 100 g. of kieselguhr is allowed to imbibe the nickel nitrate solution. The mixture is dried if necessary, finely powdered and allowed to fall gradually into a well stirred solution containing 1.15 moles of sodium carbonate in 10 liters of water and maintained at a temperature of 70° C. The precipitate is well washed and dried, after which it is reduced with hydrogen for 4 hours at a temperature of 400°–450° C.

In carrying out the hydrogenation of furfurane to tetrahydrofurfurane 5 g. of the nickel-on-kieselguhr catalyst was added to a solution of 50 g. of furfurane in 150 cc. of ethanol. The whole mixture was transferred to apparatus like that described in Example 1. The hydrogenation reaction was carried out with good agitation at a hydrogen pressure of 2600 lbs. per sq. in. No pressure drop took place at temperatures below 100° C. but at 150° C. the reaction was complete in about 15 minutes. The yield of tetrahydrofurfurane recovered by distillation was practically quantitative.

Example 3

In still another experiment normal butanol was used as the solvent with the advantages attending its higher boiling point. The reaction mixture consisted of 200 g. of furfane, 100 g. of butanol and 10 g. of the nickel-on-kieselguhr catalyst described in Example 2. At 140° C. and 1500 lbs. hydrogen pressure the reaction was complete in an hour. It was found to be a very simple matter to separate by distillation the tetrahydrofurfurane boiling at about 64° C. from the butanol solvent boiling at 116° C. In this way, a yield of about 190 g. of the tetrahydrofurfurane was obtained.

Finely divided cobalt prepared by reduction of the chromate, oxide, or carbonate may be substituted for nickel in the process of this example.

The process outlined in the above examples corresponds to the following reaction equation:

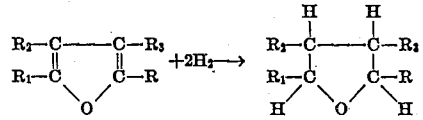

where R, R₁, R₂, and R₃ represent hydrogen atoms or hydrocarbon radicals which may be either aromatic or aliphatic in character. It will be understood that the class of furfuryl compounds hydrogenated in accordance with the teachings of the invention are intended to include radicals containing substituents other than hydrogen, i. e., hydrocarbon radicals, etc. It will be observed therefore that my invention comprises the production of a class of compounds that are properly classified as hydrofurfuranes. Thus, furfurane may be hydrogenated under the conditions given herein to tetrahydrofurfurane, and methyl and dimethyl furfuranes can be hydrogenated to the corresponding tetrahydro derivatives.

Similarly, substituted furfuranes containing aliphatic substituents higher than methyl, e. g., ethyl, propyl, butyl and dodecyl may be hydrogenated in the same way to produce the corresponding tetrahydro ethyl, propyl, butyl, and dodecyl furfuranes. The process is applicable likewise to the hydrogenation of aryl substituted furfuranes, such as phenyl furfurane, tolyl furfurane, naphthyl furfurane, or benzo furfurane (coumarone), and to the hydrogenation of hydro aryl furfuranes, such as cyclohexyl furfurane. In the case of the substituted furfuranes, the substitution may be of mono type as represented by alpha phenyl furfurane, or of the di-substituted type such as is represented by coumarone. Where aryl furfuranes are hydrogenated, the hydrogenation may be controlled to produce hydrogenation of only the furfurane ring, (partial hydrogenation being easily effected in solution), or both the aryl and the furfurane ring may be hydrogenated to completion.

The process comprising the present invention is a liquid phase process. The liquid phase hydrogenation of furfuranes makes possible an easy control of the reaction so as to prevent splitting of the furfurane ring in the production of by-products in large amounts.

The hydrogenation is preferably carried out with the use of a solvent. Solvents which may be used are saturated alcohols, e. g., ethyl, propyl, and butyl alcohol, and saturated normally liquid hydrocarbons. However, in some cases, especially when working with substituted furfuranes having a high molecular weight, the solvent may desirably be dispensed with entirely.

The reaction temperature must be so regulated that the reaction will take place at a satisfactory rate. The temperature, however, must not be so high as to cause a splitting or opening of the oxygen bridge in the furfurane ring. Suitable temperatures are found within the range of 100° to 200° C.

The hydrogenation reaction is carried on under pressure. The control of pressure is much less important than the control of temperature and a wide range of pressures may be employed. Pressures as low as 10 atmospheres may be used, the upper pressure being limited only by the strength of the apparatus. However, greater rates of reaction, particularly when utilizing temperatures towards the lower end of the preferred temperature range, are obtained by using comparatively high pressures. My preferred pressure range is 50 to 250 atmospheres. All of the pressures mentioned herein are gauge pressures.

I have found that the metal catalysts of the iron group have many advantages for the hydrogenation of furfuranes. They are much cheaper than the noble metals such as platinum and palladium, and are far more resistant to poisoning. They may be used as catalysts in their metallic form or in the form of their oxides, hydroxides, chromates, chromites, and the like. They are preferably used in conjunction with an inert support such as kieselguhr, pumice, active carbon, silica gel, and the like. Finely divided metallic nickel is the preferred form of catalyst and may be prepared in an active form by a number of alternative methods. The preferred method consists of reduction with hydrogen of such oxygen-containing nickel compounds as the oxide, hydroxide or salt of an inorganic acid such as chromic acid, vanadic acid, tungstic acid, and the like. Suitable temperatures at which the nickel containing compounds may be reduced are found in the range of 350° to 500° C. Ammonia and other reducing gases than hydrogen may be used for the purpose of reducing the nickel compounds to the metallic state. When reducing nickel chromate with hydrogen, the chromium oxide released from the chromate serves as an inert supporting body for the nickel.

The hydrogenation process comprising the present invention may be operated either continuously or intermittently and it may be in the form of a dynamic or of a static (batch) process.

The tetrahydrofurfuranes produced in accordance with the present invention have diverse uses in the arts. They have the unique property, particularly among the furfuranes of low molecular weight, of possessing a solvent action comparable to ethers, while being miscible with water as well as with oil. Tetrahydrofurfuranes may also serve as intermediates for the preparation of valuable synthetic products.

The above description and examples are illustrative only and are not to be construed as limiting the scope of the invention. Any modification or variation therefrom which conforms to the spirit of the invention is to be included within the scope of the claims.

I claim:

1. A process for preparing hydrofurfuranes which comprises reacting hydrogen with furfurane under a pressure of 10 to 250 atmospheres and at a temperature of 100 to 200° C. in the presence of a catalyst comprising essentially a metal of the iron group, said process being carried out in the liquid phase.

2. A process for preparing hydrofurfuranes which comprises reacting hydrogen with furfurane under a pressure of 50 to 250 atmospheres and at a temperature of 100 to 200° C. in the presence of a catalyst comprising essentially nickel, said process being carried out in the liquid phase.

3. A process for preparing hydrofurfuranes which comprises reacting hydrogen with furfurane under a pressure of 50 to 250 atmospheres and at a temperature of 100 to 200° C. in the presence of a catalyst comprising essentially a metal of the iron group, said process being carried out in the liquid phase.

4. A process for preparing hydrofurfuranes which comprises reacting hydrogen with furfurane under a pressure of 50 to 250 atmospheres and at a temperature of 100 to 200° C. in the presence of a catalyst comprising essentially a metal of the iron group supported on an inert carrier, said process being carried out in the liquid phase.

5. A process for preparing hydrofurfuranes which comprises reacting hydrogen with furfurane under a pressure of 50 to 250 atmospheres and at a temperature of 100 to 200° C. in the presence of a catalyst comprising essentially nickel suported on an inert carrier, said process being carried out in the liquid phase.

6. A process for preparing hydrofurfuranes which comprises reacting hydrogen with furfurane under a pressure of 10 to 250 atmospheres and at a temperature of 100° to 200° C. in the presence of a catalyst comprising essentially a metal of the iron group associated with chromium oxide, said process being carried out in the liquid phase.

7. A process for preparing hydrofurfuranes which comprises reacting hydrogen with furfurane under a pressure of 10 to 250 atmospheres and at a temperature of 100° to 200° C. in the presence of a catalyst comprising essentially a metal of the iron group associated with chromium oxide, said catalyst being prepared by reducing with hydrogen a chromite of a metal of the iron group, the hydrogenation of the furfurane derivative being carried out in the liquid phase.

8. A process for preparing hydrofurfuranes which comprises reacting hydrogen with furfurane under a pressure of 50 to 250 atmospheres and at a temperature of 100° to 200° C. in the presence of a catalyst comprising essentially nickel associated with chromium oxide, said process being carried out in the liquid phase.

9. A process for preparing hydrofurfuranes which comprises reacting hydrogen with furfurane in the liquid phase, under a pressure of 50 to 250 atmospheres and at a temperature of 100° to 200° C. in the presence of a catalyst comprising essentially nickel associated with chromium oxide, said catalyst being prepared by reducing a nickel chromite with hydrogen.

10. The process of claim 5 characterized in that the catalyst comprises essentially nickel supported on kieselguhr.

11. The process of claim 5 characterized in that the catalyst comprises essentially nickel supported on chromium oxide.

12. A process for preparing hydrofurfuranes which comprises reacting hydrogen with furfurane under a pressure of 50 to 250 atmospheres and at a temperature of 100 to 200° C. in the presence of a catalyst comprising essentially a metal of the iron group on a carrier, said process being carried out in the liquid phase.

WILBUR A. LAZIER.